US011975461B2

United States Patent
Eyermann et al.

(10) Patent No.: US 11,975,461 B2
(45) Date of Patent: May 7, 2024

(54) INERTABLE CONTAINER FOR TRANSPORTING AN ADDITIVE MANUFACTURING POWDER

(71) Applicant: AddUp, Cebazat (FR)

(72) Inventors: Didier Eyermann, Cebazat (FR); Ludovic Angele, Cebazat (FR); Antonio Gonzalez, Cebazat (FR)

(73) Assignee: ADDUP, Cebazat (FR)

( * ) Notice: Subject to any disclaimer, the term of this patent is extended or adjusted under 35 U.S.C. 154(b) by 1007 days.

(21) Appl. No.: 16/770,158

(22) PCT Filed: Dec. 3, 2018

(86) PCT No.: PCT/FR2018/053079
§ 371 (c)(1),
(2) Date: Jun. 5, 2020

(87) PCT Pub. No.: WO2019/110900
PCT Pub. Date: Jun. 13, 2019

(65) Prior Publication Data
US 2021/0162507 A1    Jun. 3, 2021

(30) Foreign Application Priority Data
Dec. 5, 2017 (FR) ...................... 1761659

(51) Int. Cl.
*B29C 31/02* (2006.01)
*B22F 10/73* (2021.01)
(Continued)

(52) U.S. Cl.
CPC .............. *B29C 31/02* (2013.01); *B22F 10/73* (2021.01); *B22F 12/52* (2021.01); *B22F 12/86* (2021.01);
(Continued)

(58) Field of Classification Search
CPC ....... B29C 31/02; B29C 64/307; B22F 10/73; B22F 10/25; B22F 10/28; B22F 10/10;
(Continued)

(56) References Cited

U.S. PATENT DOCUMENTS 5,150,735 A * 9/1992 Bandy .................. F16L 37/30
137/614
5,884,660 A * 3/1999 Cathrein .............. B65G 69/183
285/97

(Continued)

FOREIGN PATENT DOCUMENTS

CN    101367460 A    9/2008
CN    104093652 A    10/2014
(Continued)

OTHER PUBLICATIONS

International Search Report dated Apr. 1, 2019, in corresponding PCT/FR2018/053079 (6 pages).

(Continued)

*Primary Examiner* — Nicolas A Arnett
(74) *Attorney, Agent, or Firm* — VENABLE LLP

(57) ABSTRACT

An inertable container (10) for transporting an additive manufacturing powder comprises an inertable volume (12) and a main opening (14) granting access to the inside of this inertable volume, the inertable volume (12) comprising an upper portion (16) and a lower portion (18), the main opening (14) being located in the lower portion (18) of the inertable volume, and the section (S12) of the inertable volume (12) increasing gradually over at least part of the height (H10) of the container (10) and from the lower portion (18) towards the upper portion (16) of the inertable volume. The main opening is equipped with a passive half-valve (20) allowing this main opening (14) to be closed in such a way as to be sealed in an airtight and humidity- (Continued)

proof manner. The container comprises at least two inerting tappings.

10 Claims, 2 Drawing Sheets

(51) Int. Cl.

| | |
|---|---|
| *B22F 12/52* | (2021.01) |
| *B22F 12/86* | (2021.01) |
| *B29C 64/307* | (2017.01) |
| *B33Y 40/00* | (2020.01) |
| *B65D 81/20* | (2006.01) |
| *B65D 81/24* | (2006.01) |
| *B65D 88/00* | (2006.01) |
| *B65D 88/26* | (2006.01) |
| *B65D 88/74* | (2006.01) |
| *B65D 90/62* | (2006.01) |
| *B22F 10/25* | (2021.01) |
| *B22F 10/28* | (2021.01) |
| *B33Y 30/00* | (2015.01) |

(52) U.S. Cl.
CPC ............ *B29C 64/307* (2017.08); *B33Y 40/00* (2014.12); *B65D 81/20* (2013.01); *B65D 81/24* (2013.01); *B65D 88/00* (2013.01); *B65D 88/26* (2013.01); *B65D 88/745* (2013.01); *B65D 90/623* (2013.01); *B22F 10/25* (2021.01); *B22F 10/28* (2021.01); *B33Y 30/00* (2014.12); *B65D 2590/666* (2013.01)

(58) Field of Classification Search
CPC ...... B22F 12/52; B22F 12/86; B22F 2999/00; B65D 81/20; B65D 81/24; B65D 88/00; B65D 88/26; B65D 88/745; B65D 90/623; B65D 90/48; B65D 90/626; B65D 90/66; B65D 2590/666; B33Y 40/00; B33Y 30/00; Y02P 10/25
See application file for complete search history.

(56) References Cited

U.S. PATENT DOCUMENTS

| | | | | |
|---|---|---|---|---|
| 6,311,745 | B1* | 11/2001 | Welch ...................... | B65B 1/16 |
| | | | | 141/346 |
| 8,740,187 | B2* | 6/2014 | Barton .................... | F16K 1/223 |
| | | | | 251/367 |
| 9,382,065 | B2* | 7/2016 | Gallacher ............... | B65B 31/04 |
| 9,415,884 | B2* | 8/2016 | Bordere ............... | B65G 69/182 |
| 9,919,816 | B2* | 3/2018 | Tenegal ................... | B65B 1/28 |
| 10,167,102 | B2* | 1/2019 | Rubitschung ......... | B65B 39/007 |
| 2007/0122257 | A1* | 5/2007 | Bauer ................... | B65D 88/30 |
| | | | | 414/288 |
| 2010/0126622 | A1* | 5/2010 | Koch ................... | B65D 90/623 |
| | | | | 141/1 |
| 2012/0159993 | A1* | 6/2012 | Geertsen ............... | H01L 31/182 |
| | | | | 65/157 |
| 2015/0027563 | A1* | 1/2015 | Barton .................. | F16K 5/0605 |
| | | | | 251/367 |
| 2015/0096269 | A1* | 4/2015 | Tenegal ............... | B65D 90/545 |
| | | | | 53/473 |
| 2015/0114996 | A1* | 4/2015 | Gallagher .............. | B65D 90/14 |
| | | | | 141/59 |
| 2017/0297813 | A1* | 10/2017 | Carroll ................... | B33Y 30/00 |
| 2019/0126163 | A1* | 5/2019 | Szczap ................... | B01D 1/18 |
| 2019/0337714 | A1* | 11/2019 | Carroll .................. | B33Y 50/00 |

FOREIGN PATENT DOCUMENTS

| | | |
|---|---|---|
| FR | 2983182 A1 | 5/2013 |
| GB | 2520161 A | 5/2015 |
| WO | 2013/162352 A1 | 10/2013 |

OTHER PUBLICATIONS

"SteriSplit Valve Designed to Transfer Sterile or Potentially Toxic Products" Nov. 24, 2016, retrieved from the Internet: https://bulkinside.com/sterisplit-valve/,XP055500591 (4 pp).

* cited by examiner

INERTABLE CONTAINER FOR TRANSPORTING AN ADDITIVE MANUFACTURING POWDER

BACKGROUND

The invention is in the field of powder based additive manufacturing by fusing grains of this powder using one or more power sources, such as one or more laser beams and/or one or more electron beams.

More specifically, the invention is in the field of additive manufacturing by depositing a powder bed or by powder spraying.

The aim of the invention is to facilitate the transportation and the storage of several tens of litres of additive manufacturing powder, while preserving the qualities of the powder. The invention also aims to facilitate the supply of powder to various additive manufacturing machines or other devices that are useful for additive manufacturing, such as powder sieving or drying devices. The invention also aims to facilitate the recovery of powder from various additive manufacturing machines or from other devices that are useful for additive manufacturing, such as powder sieving or drying devices, or devices for cleaning manufactured parts and manufacturing platforms. Finally, the invention also aims to facilitate the packaging or repackaging of batches of new or recycled powder.

In the field of additive manufacturing by depositing a powder bed or by powder spraying, the quality of the manufactured parts is directly associated with the quality of the additive manufacturing powder that is used. Therefore, if the quality of the powder is degraded during its transportation, its storage or its transferral to an additive manufacturing machine or to another device, the parts manufactured with this powder will offer worse performance or could even have faults causing these parts to be scrapped.

For example, the chemical composition of an additive manufacturing powder can evolve by physicochemical reaction, such as, for example, by oxidation, by adsorption or by absorption, in contact with the water vapour, the oxygen and/or the nitrogen contained in the air present in the workshop where the powder is used, and this evolution can cause a reduction in the mechanical resistance of the manufactured parts or a reduction in the corrosion resistance of the manufactured parts.

At the same time, and due to some toxic chemical compounds that they can contain or due to risks of fire or explosion associated with their oxygen reactivity, some additive manufacturing powders can also have health, hygiene or safety risks in relation to the personnel present in the workshops where these powders are handled and used.

Therefore, both in order to maintain their quality and the health and safety of personnel, additive manufacturing powders generally need to be transported, stored and transferred in sealed containers or in closed circuits, while avoiding exposing these powders to the air present in the premises where these powders are used.

Currently, the additive manufacturing powders are supplied in pots that are sealed and only contain a few litres of powder in an inert gas. On the one hand, several pots are required to supply an additive manufacturing machine for a complete production cycle. Furthermore, these pots do not allow storage that is sufficiently hermetically sealed against the outside air and the water vapour contained in this outside air over time. Finally, once opened, these pots cannot be reused to re-store the powder in an inert atmosphere.

Therefore, a requirement exists for being able to transport several tens of litres of additive manufacturing powder with a single container, which can be reused and is able to contain the powder in a protected atmosphere and in a manner that is hermetically sealed against the outside air and the water vapour contained in this outside air over time.

Finally, the additive manufacturing powders are fluid and non-attaching products and a requirement exists for facilitating the handling of these powders, while maintaining the quality of the powders and the health and safety of personnel, for example, by limiting the risks of fire and explosion during the transportation or the transferral of oxygen reactive powders.

SUMMARY

The aim of the present invention is to provide a solution to the aforementioned requirements.

To this end, the aim of the invention is an inertable container for transporting an additive manufacturing powder, the container comprising an inertable volume and a main opening granting access to the inside of this inertable volume, the inertable volume comprising an upper portion and a lower portion, the main opening being located in the lower portion of the inertable volume, and the section of the inertable volume increasing gradually over at least part of the height of this inertable volume and from the lower portion towards the upper portion of the inertable volume.

According to the invention, the main opening is equipped with a passive half-valve allowing this main opening to be closed in such a way as to be sealed in an airtight and humidity-proof manner, and the container comprises at least two inerting tappings, at least one first upper tapping granting access to the upper portion of the inertable volume and at least one second lower tapping granting access to the lower portion of the inertable volume.

By virtue of the passive half-valve, the container allows the powder to be contained in a protected atmosphere and so as to be hermetically sealed against the outside air and the water vapour contained in this outside air over time and, by virtue of the inerting tappings and of the half-valve, the container can be refilled with an inert gas with a view to being used again with a new batch of product.

Furthermore, when the inerting tappings are connected to an inert gas supply circuit, these tappings can be used to keep the pressure and the level of inert gas in the container at constant values, thus allowing any micro-leaks to be alleviated and the quality of the powder contained in this container to be guaranteed over time.

BRIEF DESCRIPTION OF THE FIGURES

Further features and advantages of the invention will become apparent from the following description. This description, which is provided by way of a non-limiting example, refers to the accompanying drawings, in which.

DETAILED DESCRIPTION

Figure 1:
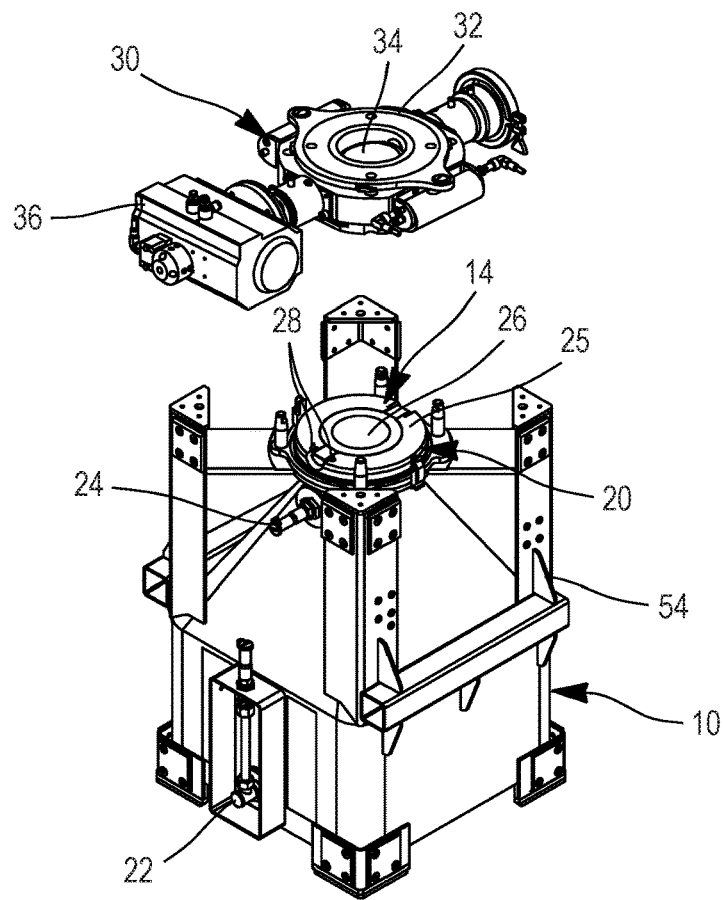
FIG. 1 is a perspective view of a container according to the invention in a first embodiment.

The invention relates to an inertable container 10 for transporting an additive manufacturing powder as shown in FIGS. 1 to 4B.

According to the invention, an additive manufacturing powder is understood to be a powder having grains with a largest grain size that is less than or equal to five hundred micrometres.

In an application that is particularly targeted by the present invention, the grains of this powder are likely to be altered through contact with the air present in the premises where this powder is used or through contact with the humidity of this air.

For example, the powders intended to be transported or stored with an inertable container according to the invention are metal powders comprising at least one or more metals that can oxidize in contact with the oxygen or the nitrogen contained in the air present in the premises where these powders are used.

With a view to transporting and storing such an additive manufacturing powder, the container 10 comprises an inertable volume 12 and a main opening 14 granting access to the inside of this inertable volume 12. More specifically, the inertable volume 12 comprises an upper portion 16 and a lower portion 18, and the main opening 14 is located in the lower portion 18 of the inertable volume.

In order to avoid having to replenish an additive manufacturing machine during production, the inertable volume 12 has a capacity of at least five litres and that can be up to two thousand litres, with the capacity of the inertable volume being adapted to the volume of the manufacturing zone or zones of the additive manufacturing machine, taking into account the amount of powder that can be excessively deposited by the means for layering or spraying powder.

In order to avoid the creation of powder retention zones in the container 10, the section S12 of the inertable volume 12 increases gradually over at least part of the height H10 of this inertable volume 12 and from the lower portion 18 towards the upper portion 16 of this inertable volume 12. Therefore, the section S12 of the inertable volume 12 increases gradually above the main opening 14, thus promoting the flow of powder towards this main opening.

Figure 2:
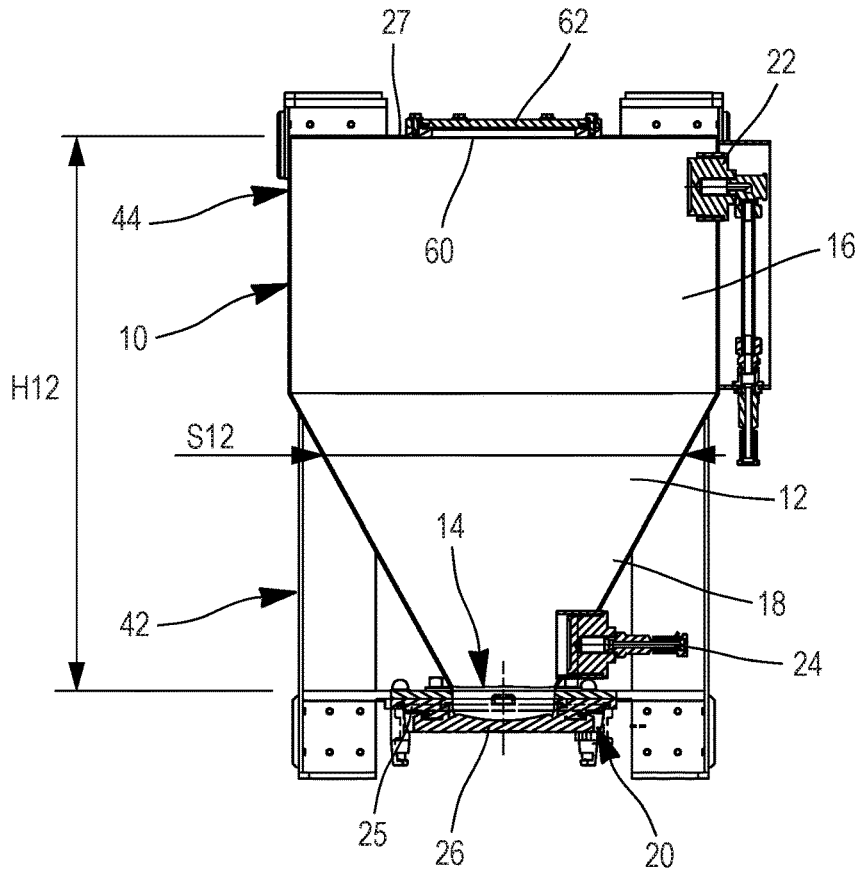
FIG. 2 is a section view along a median transverse plane of a container according to the invention in a first embodiment.

In a first embodiment shown in FIGS. 1 and 2, the section S12 of the inertable volume 12 increases gradually in the lower portion 18 of this inertable volume 12 and this section S12 of the inertable volume 12 remains constant in the upper portion 16 of this inertable volume 12.

Figure 3:
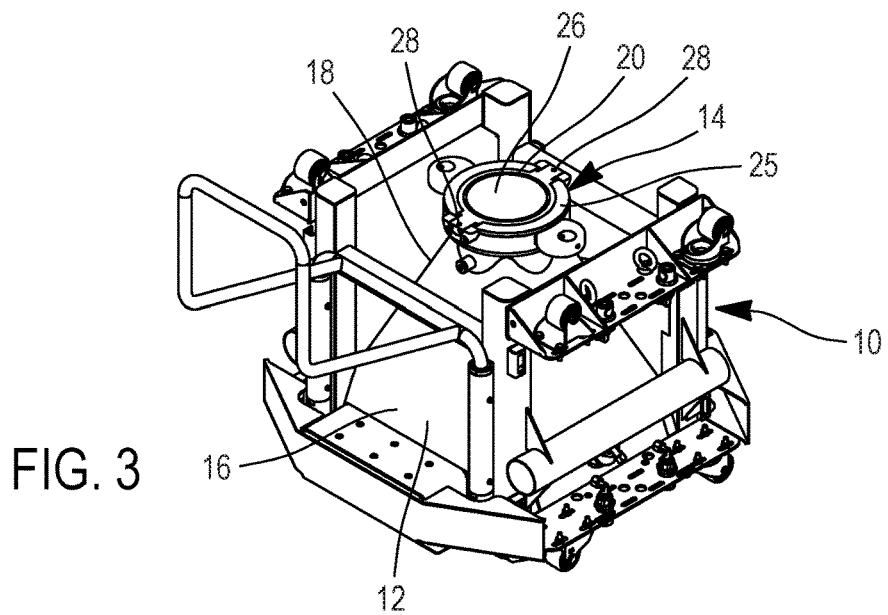
FIG. 3 is a perspective view of a container according to the invention in a second embodiment.
Figure 4A:
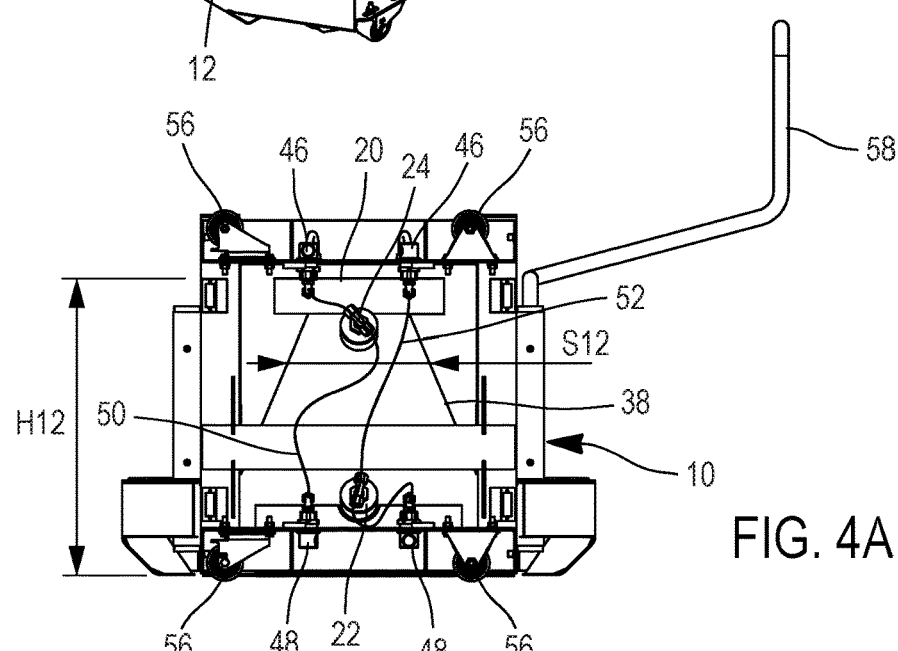
FIGS. 4A and 4B are side views of a container according to the invention in a second embodiment.
Figure 4B:
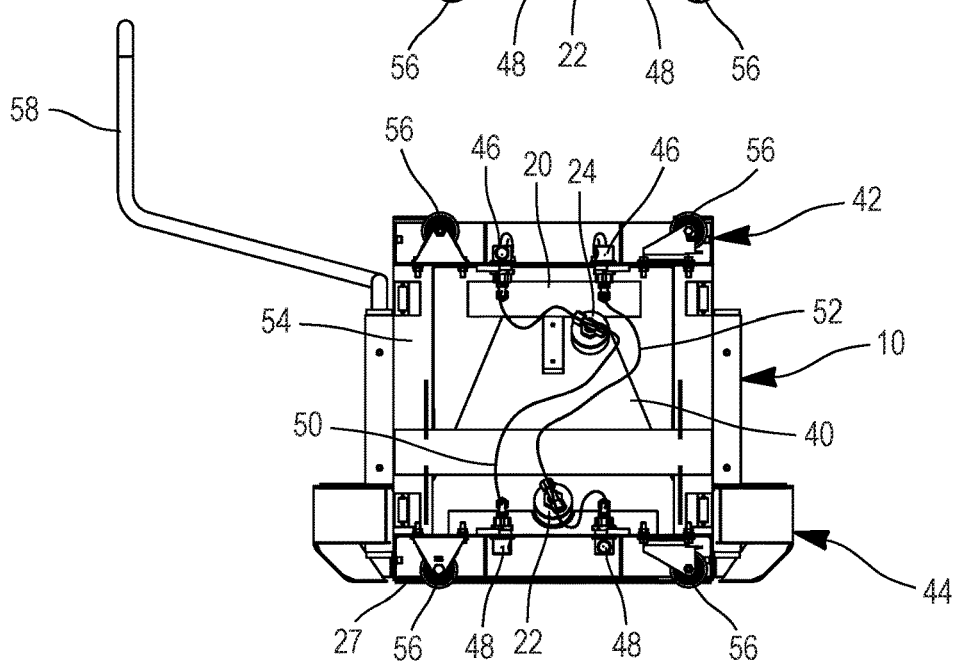

In a second embodiment shown in FIGS. 3 and 4A and 4B, the section S12 of the inertable volume 12 increases gradually over the entire height H10 of this inertable volume 12.

The inertable volume 12 can assume a frustoconical or pyramid shape in the portion where its section S12 increases gradually.

In the first and second embodiment of the container shown in the figures, the inertable volume 12 assumes the shape of a 4-sided pyramid with rounded edges between its different faces in the portion where its section S12 increases gradually.

In order to avoid any exposure of the powder to the air present outside the inertable volume 12, the main opening 14 is equipped with a passive half-valve 20 allowing this main opening 14 to be closed in an airtight and humidity-proof manner.

In combination with this passive half-valve 20, and in order to be able to fill the inertable volume 12 with an inert gas, the container 10 comprises at least two inerting tappings, at least one first upper tapping 22 granting access to the upper portion 16 of the inertable volume and at least one second lower tapping 24 granting access to the lower portion 18 of the inertable volume.

Advantageously, the presence of at least two lower and upper tappings allows the inertable container to be completely filled with inert gas irrespective of the position in which the container is used.

According to the invention, an inert gas is a gas that does not cause a physicochemical reaction, such as, for example, oxidation, adsorption or absorption, likely to degrade the features and the quality of the additive manufacturing powder. For example, for some powders, an inert gas can be nitrogen, argon, helium or a mixture of two or three of these gases.

Thus, when the container is used to supply an additive manufacturing machine or another additive manufacturing device with powder, the container is used with its main opening towards the bottom, and the inert gas is introduced into the inertable volume through an upper tapping. However, in order to facilitate the flow of the powder towards the main opening, the inert gas also can be introduced into the inertable volume through a lower tapping. More specifically, by being introduced through a lower tapping, the inert gas circulates in the powder and allows a possible accumulation of powder to be broken that would have built up above the main opening. When the inert gas is thus introduced through a lower tapping, the upper tapping can be used to discharge the inert gas and thus limit the over-pressurization of inert gas in the inertable volume.

Conversely, when the container is used to receive powder from an additive manufacturing machine or from another additive manufacturing device, the container is used with its main opening towards the top, and the inert gas is introduced into the inertable volume through a lower tapping.

Finally, when the container has been opened, emptied and exposed to the outside air, the passive half-valve is closed, and two tappings granting access to the inertable volume are used to refill the inertable volume with an inert gas, with a first tapping being used to introduce the inert gas into the inertable volume and the other tapping allowing the non-inert gases to be discharged that are present inside the inertable volume and are driven out by the inert gas introduced via the first tapping.

As illustrated in the various figures, with the upper portion of the inertable volume being closed by an upper wall 27, each lower tapping 24 is located in the immediate vicinity of the main opening 14, and each upper tapping 22 is located in the immediate vicinity of the upper wall 27.

With a view to hermetically sealing the inertable volume, the passive half-valve 20 comprises a body 25 supporting a butterfly valve 26 for closing the main opening 14 of the container 12 and means 28 for locking this butterfly valve in a closed position.

These locking means 28 are unlocked by coupling the passive half-valve with an active half-valve, with the locking means allowing the separation of the passive half-valve and of the active half-valve only when the butterfly valve 26 is in a closed position, and the locking means 28 keeping the butterfly valve 26 in a closed position as long as the passive half-valve is not coupled with an active half-valve.

An active half-valve 30 intended to be coupled with the passive half-valve 20 of the container 10 is shown in FIG. 1. This active half-valve 30 comprises a body 32 supporting a butterfly valve 34 intended to be contiguous with the butterfly valve 26 of the passive half-valve 20. Furthermore, this active half-valve 30 also comprises an actuator 36, for example, a pneumatic actuator, allowing the butterfly valve 34 of the active half-valve 30 to be rotated.

Furthermore, the means 28 for locking the butterfly valve in a closed position are unlocked by coupling the butterfly valve 26 of the passive half-valve with the butterfly valve 34 of the active half-valve, the active half-valve comprising means for unlocking the means 28 for locking the passive half-valve 20.

For example, the butterfly valve 34 of the active half-valve forms or supports the means for unlocking the means 28 for locking the passive half-valve 20.

With the means 28 for locking the passive half-valve 20 assuming, for example, the shape of at least one key or of at least one stud that are translationally movable, moving this key or this stud when the passive half-valve is coupled with an active half-valve allows the butterfly valve 26 and the butterfly valve 34 to be free to rotate about an axis passing through the main opening 14.

In order to activate the unlocking of the means 28 for locking the passive half-valve 20, the means for unlocking the active half-valve assume, for example, the shape of at least one pin, or of at least one cam, or more simply of at least one surface allowing the key or the stud of the means 28 for locking the passive half-valve 20 to be moved. The pin, the cam or the surface of the unlocking means are supported, for example, by the butterfly valve 34 of the active half-valve.

When the active half-valve is coupled to the passive half-valve, the means for unlocking the active half-valve unlock the means for locking the passive half-valve, the butterfly valve 34 of the active half-valve is contiguous with the butterfly valve 26 of the passive half-valve, and the rotation of the butterfly valve 34 under the effect of the actuator 36 of the active half-valve causes the butterfly valve 26 of the passive half-valve to rotate and therefore causes the main opening 14 to open.

In the second embodiment of the container shown in FIGS. 3, 4A and 4B, with the inertable volume 12 comprising a right-hand side 38 and a left-hand side 40, the container comprises a lower tapping 24 and an upper tapping 22 on the right-hand side of the inertable volume, and the container comprises a lower tapping 24 and an upper tapping 22 on the left-hand side of the inertable volume.

Still according to the second embodiment of the container shown in FIGS. 3, 4A and 4B, with the container 10 comprising a lower portion 42 and an upper portion 44, the container comprises at least two lower connectors 46 positioned in the lower portion 42 of the container and at least two upper connectors 48 positioned in the upper portion 44 of the container. A first upper connector 48 and a first lower connector 46 are connected by the same pipe 50 to a lower tapping 24 granting access to the lower portion 18 of the inertable volume, and a second upper connector 48 and a second lower connector 46 are connected by the same pipe 52 to an upper tapping 22 granting access to the upper portion 16 of the inertable volume.

Thus, in the second embodiment of the container, with the container comprising lower 24 and upper 22 tappings on the right-hand 38 and left-hand 40 sides of the inertable volume, the container comprises four connectors on each side of the inertable volume. On the right-hand side 38 of the inertable volume, a lower connector 46 and an upper connector 48 are connected by the same pipe 50 to a lower tapping 24, and a lower connector 46 and an upper connector 48 are connected by the same pipe 52 to an upper tapping 22. Furthermore, on the left-hand side 40 of the inertable volume, a lower connector 46 and an upper connector 48 are connected by the same pipe 50 to a lower tapping 24, and a lower connector 46 and an upper connector 48 are connected by the same pipe 52 to an upper tapping 22.

As illustrated in the various figures, the container 10 comprises a frame 54, inside which the inertable volume 12 is placed. This frame is substantially parallelepipedic and it allows the handling of the inertable volume 12 and therefore of the container to be facilitated.

Advantageously, the lower 46 and upper 48 connectors are supported by the frame 54 of the container.

In the container according to the invention, the upper portion 16 of the inertable volume forms part of the upper portion 44 of the container and the lower portion 18 of the inertable volume forms part of the lower portion 42 of the container. Thus, the dimensions of the container 10 are substantially identical to the dimensions of the inertable volume 12.

Still with a view to facilitating the handling of the inertable volume 12, the container 10 comprises castors 56 in the lower portion 42 and in the upper portion 44. These castors 56 are supported by the frame 54 of the container.

To the same end, the frame 54 of the container allows a retractable handle 58 to be accommodated in the upper portion 44 of the container or in the lower portion 42 of the container, as a function of the orientation in which the container is used (main opening towards the top or main opening towards the bottom).

Finally, to allow the inside of the inertable volume 12 to be fully cleaned, the container 10 comprises an additional opening 60 granting access to the inside of the inertable volume 12, with this additional opening being equipped with a closure cover 62.

Advantageously, the additional opening 60 is established in the upper portion 44 of the inertable volume 12. More specifically, the additional opening 60 is established through the upper portion 27 of the inertable volume 12.

This additional opening 60 is big enough to be able to allow the inside of the inertable volume 12 to be fully cleaned and the inside of the inertable volume 12 to be properly visually inspected, with this visual inspection being used to ensure that the inside of the inertable volume 12 is clean and free from any impurities before it is reclosed and refilled with inert gas and before a new batch of additive manufacturing product is introduced therein.

The invention claimed is:

1. An inertable container, for transporting an additive manufacturing powder, comprising an inertable volume and a main opening granting access to an inside of the inertable volume, the inertable volume comprising an upper portion and a lower portion, the main opening being located in the lower portion of the inertable volume, and a section of the inertable volume increasing gradually over at least part of a height of the container and from the lower portion toward the upper portion of the inertable volume, wherein the main opening is equipped with a passive half-valve allowing the main opening to be closed in such a way as to be sealed in an airtight and humidity-proof manner, and wherein the container comprises at least two inerting tappings, at least one first upper tapping granting access to the upper portion of the inertable volume and at least one second lower tapping granting access to the lower portion of the inertable volume.

2. The inertable container according to claim 1, wherein, with the passive half-valve comprising a body supporting a butterfly valve for closing the main opening of the container, the passive half-valve comprises means for locking the butterfly valve in a closed position.

3. The inertable container according to claim 2, wherein the locking means are unlocked by coupling the passive half-valve with an active half-valve, the locking means allowing separation of the passive half-valve and of the active half-valve only when the butterfly valve is in a closed position, and the locking means keeping the butterfly valve in a closed position as long as the passive half-valve is not coupled with an active half-valve.

4. The inertable container according to claim 2, wherein the locking means is unlocked by coupling the butterfly valve of the passive half-valve with a butterfly valve of an active half-valve, the active half-valve comprising means for unlocking the locking means.

5. The inertable container according to claim 1, wherein, with the inertable volume comprising a right-hand side and a left-hand side, the container comprises a lower tapping and an upper tapping on the right-hand side of the inertable volume, and the container comprises a lower tapping and an upper tapping on the left-hand side of the inertable volume.

6. The inertable container according to claim 1, wherein, with the container comprising a lower portion and an upper portion, the container comprises at least two lower connectors positioned in the lower portion of the container and at least two upper connectors positioned in the upper portion of the container, a first upper connector and a first lower connector being connected by a same pipe to a lower tapping granting access to the lower portion of the inertable volume, and a second upper connector and a second lower connector being connected by the same pipe to an upper tapping granting access to the upper portion of the inertable volume.

7. The inertable container according to claim 1, wherein the upper portion of the inertable volume forms part of the upper portion of the container, and wherein the lower portion of the inertable volume forms part of the lower portion of the container.

8. The inertable container according to claim 1, wherein the section of the inertable volume increases gradually over the entire height of the inertable volume.

9. The inertable container according to claim 1, wherein the section of the inertable volume increases gradually in the lower portion of the inertable volume, and wherein the section of the inertable volume remains constant in the upper portion of the inertable volume.

10. The inertable container according to claim 1, wherein the container comprises an additional opening granting access to the inside of the inertable volume, the additional opening being equipped with a closure cover.

* * * * *